(12) United States Patent
Tanaka

(10) Patent No.: US 6,870,702 B2
(45) Date of Patent: Mar. 22, 2005

(54) HEIGHT ADJUSTING MECHANISM FOR A TAPE GUIDE PIN AND TAPE DEVICE

(75) Inventor: Shinya Tanaka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 134 days.

(21) Appl. No.: 10/242,109

(22) Filed: Sep. 12, 2002

(65) Prior Publication Data

US 2003/0048558 A1 Mar. 13, 2003

(30) Foreign Application Priority Data

Sep. 13, 2001 (JP) .................................. 2001-006046 U

(51) Int. Cl.[7] .............................................. G11B 5/27
(52) U.S. Cl. ...................................................... 360/85
(58) Field of Search ............................ 360/85, 75, 31; 242/76, 615.3, 615; 226/21, 190

(56) References Cited

U.S. PATENT DOCUMENTS

| | | | | |
|---|---|---|---|---|
| 4,060,840 A | * | 11/1977 | Umeda | 360/130.23 |
| 4,264,937 A | * | 4/1981 | Kabacinski | 360/85 |
| 4,410,920 A | * | 10/1983 | Kawai | 360/85 |
| 4,672,479 A | * | 6/1987 | Takao et al. | 360/95 |
| 5,293,283 A | * | 3/1994 | Masuda et al. | 360/85 |
| 5,341,257 A | * | 8/1994 | Dienbauer | 360/85 |
| 5,407,117 A | * | 4/1995 | Yokoo et al. | 226/190 |
| 5,784,229 A | * | 7/1998 | Hashi et al. | 360/130.21 |
| 6,160,675 A | * | 12/2000 | Shudo et al. | 360/72.3 |

FOREIGN PATENT DOCUMENTS

| | | | | |
|---|---|---|---|---|
| DE | 0 199 068 A1 | * | 3/1986 | ........... G11B/15/60 |
| JP | 63100658 A | * | 5/1988 | ......... G11B/15/665 |
| JP | 2-227859 | | 9/1990 | |
| JP | 4-315852 | | 11/1992 | |
| JP | 5-50548 | | 7/1993 | |
| JP | 2000-30232 | | 1/2000 | |

OTHER PUBLICATIONS

English Translation of Koga (JP 2000–030232).*
Patent Abstracts of Japan, Publication No. JP2227859; Sep. 11, 1990; 1 page.
Patent Abstracts of Japan, Publication No. JP4315852; Nov. 6, 1992; 1 page.
Patent Abstracts of Japan, Publication No. JP2000030232; Jan. 28, 2000; 1 page.

* cited by examiner

Primary Examiner—George J. Letscher
Assistant Examiner—Christopher R. Magee
(74) Attorney, Agent, or Firm—Osha & May L.L.P.

(57) ABSTRACT

A height adjusting mechanism for a tape guide pin has a tape guide arm, a plate spring member, and a height adjusting screw. The tape guide arm is supported by a VCR chassis in a swingable and vertically movable manner, and the tape guide pin is attached to one end of the arm. In the plate spring member, one end is fixed to the VCR chassis, the other end is a free end, and the upper face of the free end butts against the lower face of the tape guide arm. The height adjusting screw is screwed with the free end of the plate spring member, and the tip end of the screw is pressingly contacted with the VCR chassis by the elastic force of the plate spring member, and a head portion of the screw vertically overlaps with the other end of the tape guide arm.

3 Claims, 3 Drawing Sheets

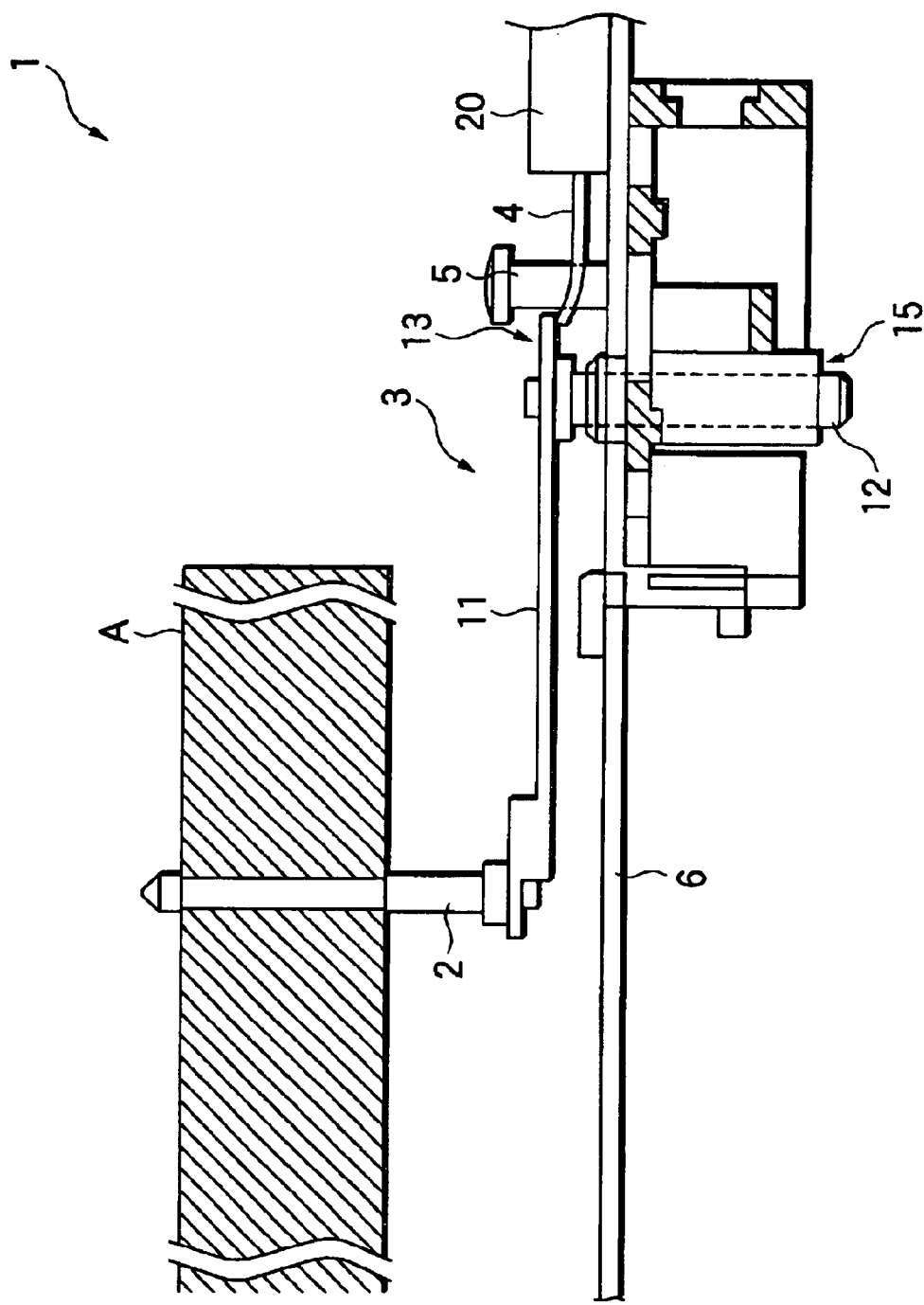

HEIGHT ADJUSTING MECHANISM FOR A TAPE GUIDE PIN AND TAPE DEVICE

BACKGROUND OF THE INVENTION

1. Field of the Invention

The present invention relates to a height adjusting mechanism for a tape guide, and more particularly to a height adjusting mechanism for a tape guide which adjusts the height position of a tape guide pin that guides running of a VCR cassette tape.

2. Description of the Related Art

In a recording and reproducing apparatus such as a VCR (Video Cassette Recorder), a tape guide pin is disposed in order to guide running of a magnetic tape and also to regulate the height position of the running magnetic tape. The tape guide pin is supported by one end of a tape guide arm. A tape guide arm is described in, for example, JP-A-2-227859, JP-A-4-315852, and JP-A-2000-30232. Usually, a swing shaft that protrudes downwardly from the tape guide arm is attached to a chassis in a swingable and vertically movable manner.

Conventionally, in order to position the height position of the tape guide pin during a process of assembling a VCR, a height adjusting screw is screwed into another end portion of the tape guide arm, and the tip end of the height adjusting screw is passed through the tape guide arm to butt against the chassis. In order to prevent the screw from loosening, a spring is interposed between the tape guide arm and a head portion of the screw so as to always apply tension between the screw and the tape guide arm. By rotating the height adjusting screw, the distance between the tip end of the screw (i.e., the upper face of the chassis) and the tape guide arm is adjusted to vertically move the tape guide arm, thereby adjusting the height position of the tape guide pin that is supported by the one end of the tape guide arm.

As described above, the tape guide arm is attached so as to be vertically movable with respect to the chassis. In order to prevent the tape guide arm from slipping out from the chassis, a washer is disposed on the tip end of the swing shaft that protrudes downwardly below the chassis.

In the conventional height adjusting mechanism for a tape guide pin, the spring is necessary for preventing the height adjusting screw from loosening. Moreover, a process of forming a screw hole is required for allowing the tape guide arm to be smoothly vertically moved. Since the swing shaft and the tape guide arm are integrally vertically moved, the washer should be disposed on the tip end of the swing shaft for preventing them from slipping out from the chassis, and a process for attaching the washer is necessary. Therefore, the mechanism requires a large number of parts, and an increased number of processes. Moreover, many assembling steps must be additionally conducted in order to attach the spring and the washer, and the assembling processes are cumbersome, thereby causing a problem in that the assembling cost is high.

SUMMARY OF THE INVENTION

It is an object of the invention to provide a height adjusting mechanism for a tape guide pin in which the numbers of parts and processes can be reduced, and the number of steps in assembling of a VCR can be decreased.

According to a first aspect of the invention, a height adjusting mechanism for a tape guide pin adjusts the height position of the tape guide pin that guides running of a VCR cassette tape. The height adjusting mechanism includes a tape guide arm, a plate spring member, and a tapping screw. The tape guide arm is a member which is supported by a chassis of a VCR in a swingable and vertically movable manner, and in which the tape guide pin is attached to one end. The plate spring member is disposed on a door opener that is disposed on the chassis to open a front door of the VCR cassette tape. The plate spring member is a resin-made member in which one end is fixed to the door opener, the other end is a free end, and the upper face of the free end is buttable against the lower face of the other end of the tape guide arm. The tapping screw is a height adjusting member in which the tip end butts against the chassis, and a head portion vertically overlaps with the other end of the tape guide arm, and which is screwed with the free end of the plate spring member. Under a state where the tapping screw is screwed with the plate spring member, the lower end of the tapping screw is pressingly contacted with the chassis by the elastic force of the plate spring member.

In such height adjusting mechanism, the tape guide arm is supported by the chassis in a vertically movable manner, and the tape guide pin is attached to one end of the tape guide arm. Therefore, the height position of the tape guide pin can be adjusted by vertically moving the tape guide arm.

When the tape guide pin is to be vertically moved, the tapping screw which is screwed with the free end of the plate spring member is rotated. The one end of the plate spring member is fixed to the chassis. Therefore, the free end of the plate spring member is vertically moved by, for example, proceeding the screwing of the tapping screw while the tip end of the tapping screw is maintained to butt against the chassis. The lower face of the other end of the tape guide arm is in contact with the upper face of the free end of the plate spring member. When the free end of the plate spring member is upward moved, the tape guide arm is also upward moved, and in accordance with this movement the tape guide pin which is supported by the tape guide arm is upward moved. When the tapping screw is rotated in the opposite direction or in the loosening direction, the plate spring member is downward moved by its elasticity, and the tape guide arm and the tape guide pin are downward moved.

In this way, the height of the tape guide pin can be adjusted by rotating the tapping screw.

In this configuration, since the tip end of the tapping screw butts against the chassis and the plate spring member with which the tapping screw is screwed has the elasticity, the tip end of the tapping screw is pressingly contacted with the chassis by the plate spring member. Therefore, tension always acts between the tapping screw and the plate spring member. As a result, the spring for preventing loosening which is disposed in the conventional mechanism is not required. Conventionally, a height adjusting screw is screwed with the tape guide arm. By contrast, in the invention, the tapping screw is screwed with the plate spring member, and hence a tapping process on the tape guide arm is not necessary. The head portion of the tapping screw is disposed so as to vertically overlap with the other end of the tape guide arm. When the tape guide arm is upward moved, therefore, the arm collides with the head portion of the tapping screw, whereby the tape guide arm can be prevented from upward slipping out. Consequently, the washer that is disposed in the conventional mechanism for preventing slipping out can be omitted.

The plate spring member is made of a resin. In order to enable the tapping screw to be screwed with the plate spring member by screwing the tapping screw, it is requested only to open a prepared hole. Consequently, the tapping process can be simplified.

Since the plate spring member is fixed to the door opener which is secured to the VCR chassis, it is not required to particularly fix one end of the plate spring member to the VCR chassis.

According to a second aspect of the invention, a height adjusting mechanism for a tape guide pin adjusts the height position of a tape guide pin that guides running of a VCR cassette tape. The height adjusting mechanism includes a tape guide arm, a plate spring member, and a height adjusting screw. The tape guide arm is supported by a chassis of a VCR in a swingable and vertically movable manner, and the tape guide pin is attached to one end of the arm. The plate spring member is a member in which one end is fixed to the chassis, the other end is a free end, and the upper face of the free end is buttable against the lower face of the other end of the tape guide arm. The height adjusting screw is a member in which the tip end butts against the chassis, and ahead portion vertically overlaps with the other end of the tape guide arm, and which is screwed with the free end of the plate spring member. Under the state where the height adjusting screw is screwed with the plate spring member, the lower end of the height adjusting screw is pressingly contacted with the chassis by the elastic force of the plate spring member.

In this configuration, since the tip end of the height adjusting screw butts against the chassis and the plate spring member with which the height adjusting screw is screwed has the elasticity, the tip end of the height adjusting screw is pressingly contacted with the chassis by the plate spring member. Therefore, tension always acts between the height adjusting screw and the plate spring member. As a result, the spring for preventing loosening which is disposed in the conventional mechanism is not required. Conventionally, a height adjusting screw is screwed with the tape guide arm. By contrast, in the invention, the height adjusting screw is screwed with the plate spring member, and hence a tapping process on the tape guide arm is not necessary. The head portion of the height adjusting screw is disposed so as to vertically overlap with the other end of the tape guide arm. When the tape guide arm is upward moved, the arm collides with the head portion of the height adjusting screw, whereby the tape guide arm can be prevented from upward slipping out. Consequently, the washer that is disposed in the conventional mechanism for preventing slipping out can be omitted.

According to a third aspect of the invention, the height adjusting mechanism of the second aspect of the invention is configured so that the plate spring member is made of a resin, and the height adjusting screw is a tapping screw which can conduct a tapping process on the plate spring member.

In this configuration, a tapping process can be conducted by screwing the tapping screw serving as the height adjusting screw into the plate spring member. Therefore, it is not required to previously conduct a tapping process on the plate spring member, so that processing can be simplified.

According to a fourth aspect of the invention, the height adjusting mechanism of the second or the third aspect of the invention is configured so that the plate spring member is disposed on a door opener that is disposed on the VCR chassis to open a front door of the VCR cassette tape.

The door opener which is disposed in the vicinity of the tape guide arm is fixed to the VCR chassis. In this configuration, the plate spring member is disposed on the door opener, and hence it is not required to particularly fix one end of the plate spring member to the VCR chassis.

BRIEF DESCRIPTION OF THE DRAWINGS

FIG. 3 is a schematic side view showing an operation of the embodiment.

DETAILED DESCRIPTION OF THE PREFFERED EMBODIMENTS

Figure 1:
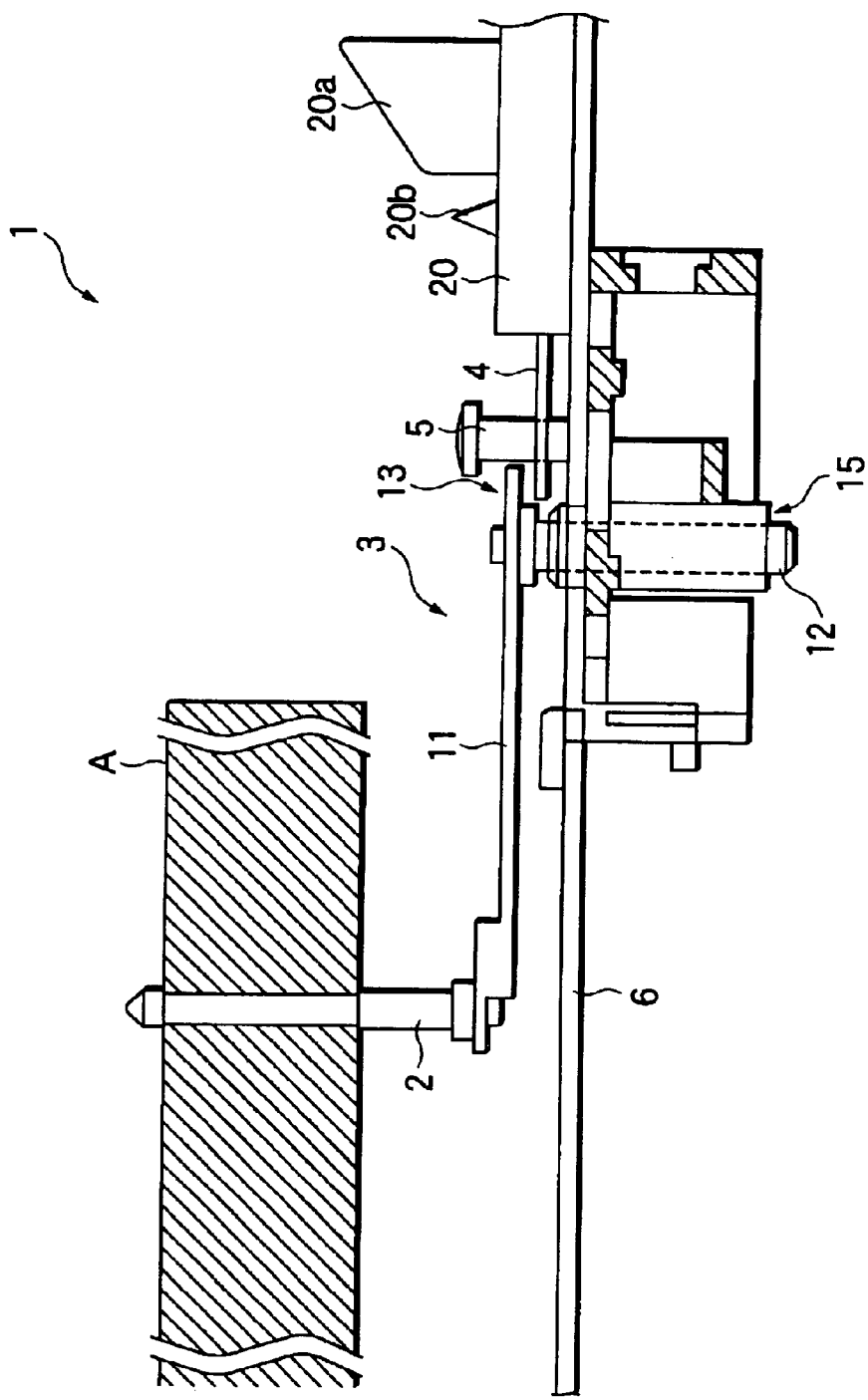
FIG. 1 is a schematic side view of a tape guide arm and a door opener in an embodiment.
Figure 2:
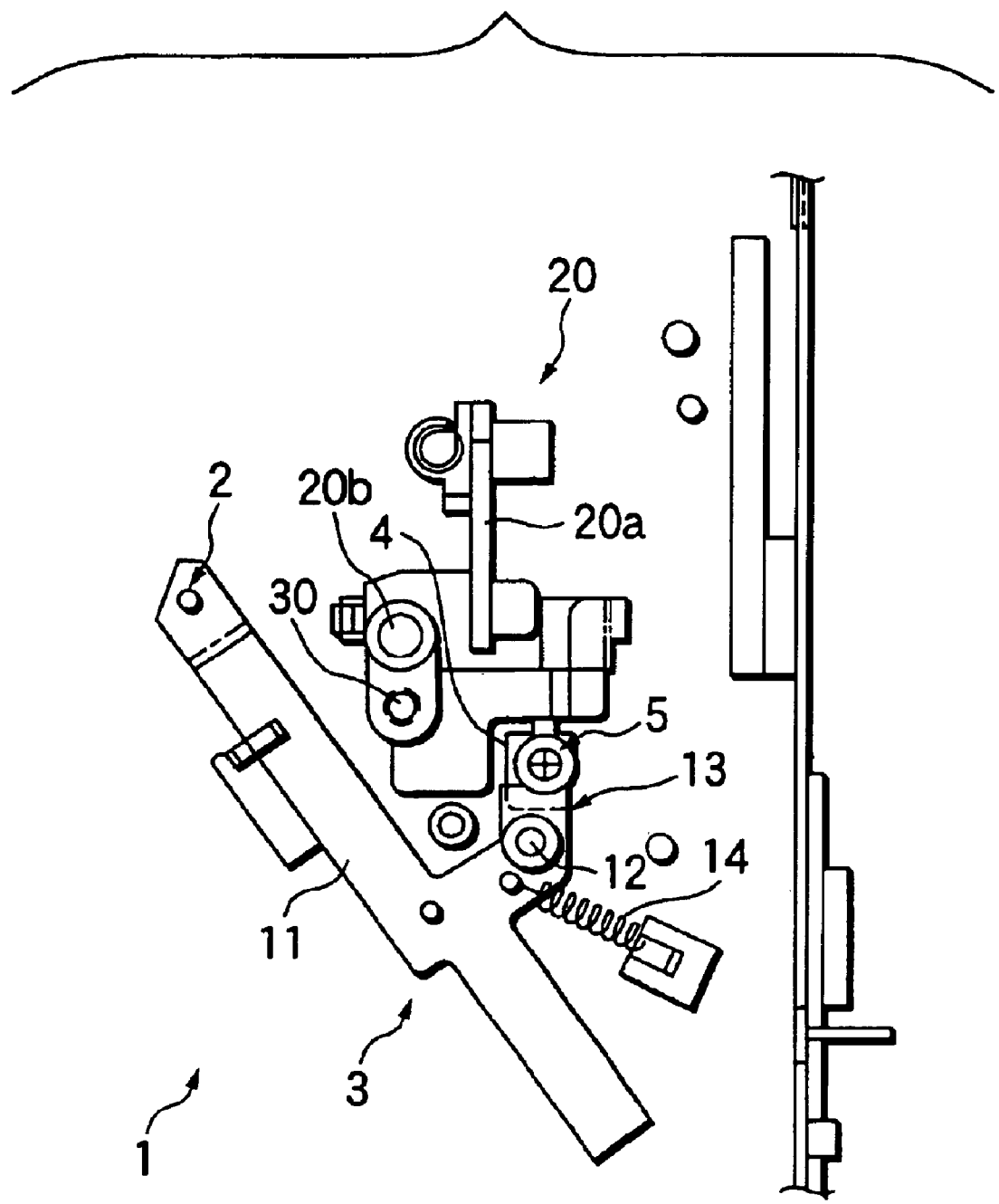
FIG. 2 is a plan view showing the arrangement of the tape guide arm and the door opener in the embodiment.

FIGS. 1 and 2 show a tape guide pin 2 of a VCR deck 1 and a height adjusting mechanism for the pin in an embodiment of the invention.

The tape guide pin 2 is a cylindrical member which guides running of a magnetic tape A of a VCR cassette (not shown) during a process of rewinding the magnetic tape A in the VCR deck 1, and which regulates the height position of the running magnetic tape A. In a cylindrical part of the tape guide pin 2, a contact portion which is to be in contact with the magnetic tape A is thin, and portions which are above and below the contact portion respectively are thick. In the thick portions of the tape guide pin 2, since running of the magnetic tape A is suppressed, the magnetic tape A runs on the thin contact portion of the tape guide pin 2. The height position of the running magnetic tape A is restricted by adjusting the height of the tape guide pin 2.

The height adjusting mechanism for the tape guide pin 2 includes a tape guide arm 3, a plate spring member 4, and a height adjusting screw 5.

The tape guide arm 3 is supported by a VCR chassis 6 serving as the base of the VCR deck 1, in a swingable and vertically movable manner. The tape guide pin 2 is attached to one end of the tape guide arm. The tape guide arm 3 has an arm portion 11 and a swing shaft 12.

The arm portion 11 swings about the swing shaft 12 to move the tape guide pin 2 that is attached to the one end of the arm portion. The arm portion 11 is formed into a substantially L-like shape, and has the tape guide pin 2 at one end and a butting portion 13 at the other end. The swing shaft 12 is disposed in the vicinity of the butting portion 13. A pulling spring 14 is disposed between the arm portion 11 and the VCR chassis 6. The pulling spring 14 pulls the arm portion 11 toward the VCR chassis 6, i.e., in a downward direction. The arm portion 11 is further elongated from the vicinity of the swing shaft 12 to the side opposite to the one end where the tape guide pin 2 is disposed. A protrusion which is not shown is formed on the elongated tip end. The protrusion butts against a cam which is not shown, and which is placed below the VCR chassis 6, so that the arm portion 11 can be swung when the cam is rotated.

The swing shaft 12 swingably supports the arm portion 11, and inserted into a support hole 15 of the VCR chassis 6 so as to be supported thereby. Consequently, the tape guide arm 3 is supported in a swingable and vertically movable manner with respect to the VCR chassis 6.

The plate spring member 4 is a member which is elastic and made of a resin. The plate spring member 4 is integrally formed with a door opener 20 which is made of a resin as well. One end of the plate spring member 4 is jointed to the door opener 20, and the other end is a free end. The upper face of the free end of the plate spring member 4 butts against the lower face of the butting portion 13 of the arm portion 11. The door opener 20 is a resin molded member which, when a VCR cassette is loaded onto the VCR deck 1, positions a front portion of the VCR cassette, opens and holds a door formed in the front portion of the VCR cassette. The door opener 20 is secured to the VCR chassis 6 by a screw 30. Numeral 20a denotes a contacting portion which is formed into a substantially trapezoidal shape and which engages with the door of the VCR cassette. Numeral 20b denotes a positioning portion which is formed into a conical shape and which effects positioning of the VCR cassette.

The height adjusting screw 5 adjusts the height of the free end of the plate spring member 4. The tip end of the height adjusting screw 5 butts against the VCR chassis 6. A head portion of the height adjusting screw 5 is disposed so as to vertically overlap with the butting portion 13 of the arm portion 11. When the tape guide arm 3 is moved upwardly, the arm collides with the head portion of the height adjusting screw 5. Because of this arrangement and the pulling force by the pulling spring 14, it is possible to prevent a situation where the swing shaft 12 disengages from the support hole 15 and the tape guide arm 3 slips out, from occurring.

In the embodiment, the height adjusting screw 5 is attached to the plate spring member 4, and the plate spring member 4 is configured so that, under a state where the tip end of the height adjusting screw 5 butts against the VCR chassis 6, the tip end of the height adjusting screw 5 is pressingly contacted with the VCR chassis 6, by the elastic force of the plate spring member 4. Under this state, tension always acts between the height adjusting screw 5 and the plate spring member 4. Therefore, the spring for preventing loosening which is disposed in the conventional mechanism is not required.

The height adjusting screw 5 is a tapping screw, and the plate spring member 4 is made of a resin in the same manner as the door opener 20. The height adjusting screw 5 can be screwed into a prepared hole that is previously formed in the plate spring member 4, conducting a tapping process.

Hereinafter, the operation of the height adjusting mechanism for the tape guide pin 2 will be described.

The arm portion 11 of the tape guide arm 3 is supported from below by the free end of the plate spring member 4, and at the same time downward pulled by the pulling spring 14. The height position of the tape guide arm 3 is defined by such configuration. Moreover, the height position of the free end of the plate spring member 4 can be adjusted by rotating the height adjusting screw 5.

By proceeding the screwing of the height adjusting screw 5, for example, the free end of the plate spring member 4 is upward moved while the tip end of the height adjusting screw 5 is maintained to butt against the chassis as shown in FIG. 3. When the free end of the plate spring member 4 is upward moved, the tape guide arm 3 also is upward moved, and in accordance with this movement the tape guide pin 2 supported by the tape guide arm 3 is upward moved. When the height adjusting screw 5 is rotated in the opposite direction or in the loosening direction, the plate spring member 4 is downward moved by its elasticity, and the tape guide arm 3 and the tape guide pin 2 are downward moved.

In this way, the height position of the tape guide arm 3 is adjusted by rotating the height adjusting screw 5. In accordance with this adjustment, the height position of the tape guide pin 2 is adjusted. As a result, the height position of the running magnetic tape A can be adjusted.

The height adjusting mechanism for a tape guide pin in the above-described embodiment attains the following effects.

Since the elastic plate spring member 4 causes the height adjusting screw 5 to be pressingly contacted with the VCR chassis 6, tension always acts between the height adjusting screw 5 and the plate spring member 4. Therefore, the spring which is used for preventing the height adjusting screw 5 from loosening in the conventional mechanism is not required.

Since the head portion of the height adjusting screw 5 is disposed so as to vertically overlap with the butting portion 13 of the arm portion 11, a situation where the swing shaft 12 disengages from the support hole 15 and the tape guide arm 3 slips out can be prevented from occurring. Consequently, the washer that is disposed in the conventional mechanism for preventing slipping out can be omitted.

In the height adjusting mechanism for a tape guide pin of the invention, since a tip end of a tapping screw butts against a chassis and the plate spring member with which the tapping screw is screwed has the elasticity, the tip end of the tapping screw is pressingly contacted with the chassis by the plate spring member. Therefore, tension always acts between the tapping screw and the plate spring member. As a result, the spring for preventing loosening which is disposed in the conventional mechanism is not required. The head portion of the tapping screw is disposed so as to vertically overlap with the other end of the tape guide arm. When the tape guide arm is upward moved, the arm collides with the head portion of the tapping screw, whereby the tape guide arm can be prevented from upward slipping out. Consequently, the washer that is disposed in the conventional mechanism for preventing slipping out can be omitted.

What is claimed is:

1. A height adjusting mechanism for a tape guide pin that guides running of a VCR cassette tape, comprising:
    a tape guide arm having the tape guide pin on one end thereof, the tape guide arm being supported by a chassis of a VCR in a swingable and vertically movable manner;
    a plate spring member made of a resin, the plate spring member having one end being fixed to a door opener that is disposed on the chassis to open a front door of the VCR cassette tape, the plate spring member having another end being a free end, an upper face of which is buttable against a lower face of the other end of the tape guide arm; and
    a height adjusting tapping screw having a tip end and a head portion that vertically overlaps with the other end of the tape guide arm,
    wherein the height adjusting tapping screw is screwed through the plate spring member, the tip end is pressingly contacted with the chassis by an elastic force of the plate spring member.

2. A height adjusting mechanism for a tape guide pin that guides running of a VCR cassette tape, comprising:
    a tape guide arm having the tape guide pin on one end thereof, the tape guide arm being supported by a chassis of a VCR in a swingable and vertically movable manner;
    a plate spring member having one end being fixed to the chassis, the plate spring member having another end being a free end, an upper face of which is buttable against a lower face of the other end of the tape guide arm; and
    a height adjusting screw having a tip end and a head portion that vertically overlaps with the other end of the tape guide arm, wherein the height adjusting screw is screwed through the plate spring member, the tip end is pressingly contacted with the chassis by an elastic force of the plate spring member; and wherein the plate spring member is disposed on a door opener that is provided on the VCR chassis to open a front door of the VCR cassette tape.

3. A height adjusting mechanism for a tape guide pin that guides running of a VCR cassette tape, comprising:

a tape guide arm having the tape guide pin on one end thereof, the tape guide arm being supported by a chassis of a VCR in a swingable and vertically movable manner;

a plate spring member having one end being fixed to the chassis, the plate spring member having another end being a free end, an upper face of which is buttable against a lower face of the other end of the tape guide arm; and a height adjusting screw having a tip end and a head portion that vertically overlaps with the other end of the tape guide arm, wherein the height adjusting screw is screwed through the plate spring member, the tip end is pressingly contacted with the chassis by an elastic force of the plate spring member;

wherein the plate spring member is made of a resin, wherein the height adjusting screw is a tapping screw that conducts a tapping process on the plate spring member, and wherein the plate spring member is disposed on a door opener that is provided on the VCR chassis to open a front door of the VCR cassette tape.

* * * * *